United States Patent [19]

Iwahara et al.

[11] Patent Number: 4,897,730

[45] Date of Patent: Jan. 30, 1990

[54] IMAGE PICKUP DEVICE WITH INDEX SIGNAL GENERATOR

[75] Inventors: Makotoi Iwahara, Yokohama; Itsuo Takanashi, Kamakura; Shintaro Nakagaki, Fujisawa; Horosi Ichimura; Ichiro Negishi, both of Yokohama; Masaru Osada, Yokosuka; Wataru Katase, Yokohama, all of Japan

[73] Assignee: Victor Company of Japan, Ltd., Yokohama, Japan

[21] Appl. No.: 239,292

[22] Filed: Sep. 1, 1988

[30] Foreign Application Priority Data

Sep. 2, 1987 [JP] Japan ............... 62-134373[U]

[51] Int. Cl.$^4$ ............................................. H04N 3/14
[52] U.S. Cl. .................................... 358/217; 350/3.67; 250/213 VT
[58] Field of Search ............... 358/225, 228, 217, 219, 358/47, 44, 213.19; 250/213 Vt; 350/314, 3.7, 3.67; 313/402

[56] References Cited

U.S. PATENT DOCUMENTS

| 4,564,893 | 1/1986 | Myrman ........................... 350/314 |
| 4,605,606 | 8/1986 | Ferrante .......................... 350/3.67 |
| 4,620,221 | 10/1986 | Takanashi et al. . |
| 4,667,245 | 5/1987 | Matsumoto et al. ........... 358/213.19 |
| 4,736,243 | 4/1988 | Takanashi et al. ................. 358/47 |

FOREIGN PATENT DOCUMENTS 63-5776  1/1988 Japan .
63-16774 2/1988 Japan .

Primary Examiner—Jin F. Ng
Assistant Examiner—Mehdi Haghani
Attorney, Agent, or Firm—Lowe, Price, LeBlanc, Becker & Shur

[57] ABSTRACT

An image pickup device comprises an image pickup tube and an index generator having a light shield box; a light emitting diode held in the light shield box; a stripe screen provided on the photosensitive layer of the image pickup tube and shading compensation filter having transmittance pattern which equalizes illuminance variation on the stripe pattern of the stripe screen caused by the light emitting diode so that illuminance at any point of the stripe pattern becomes uniform. The image pickup tube generates picture signal together with index signal which is derived from the projected stripe pattern image on peripheral portion of the photosensitive layer through the shading compensation filter which equalizes index signal output level to make timing derived from the index signal accurate. A method of providing shading compensation filter is disclosed where a sheet of negative film is placed on the opening of the light shield box, exposed to the light emitting diode. Then the sheet of film is developed by chemical process.

3 Claims, 3 Drawing Sheets

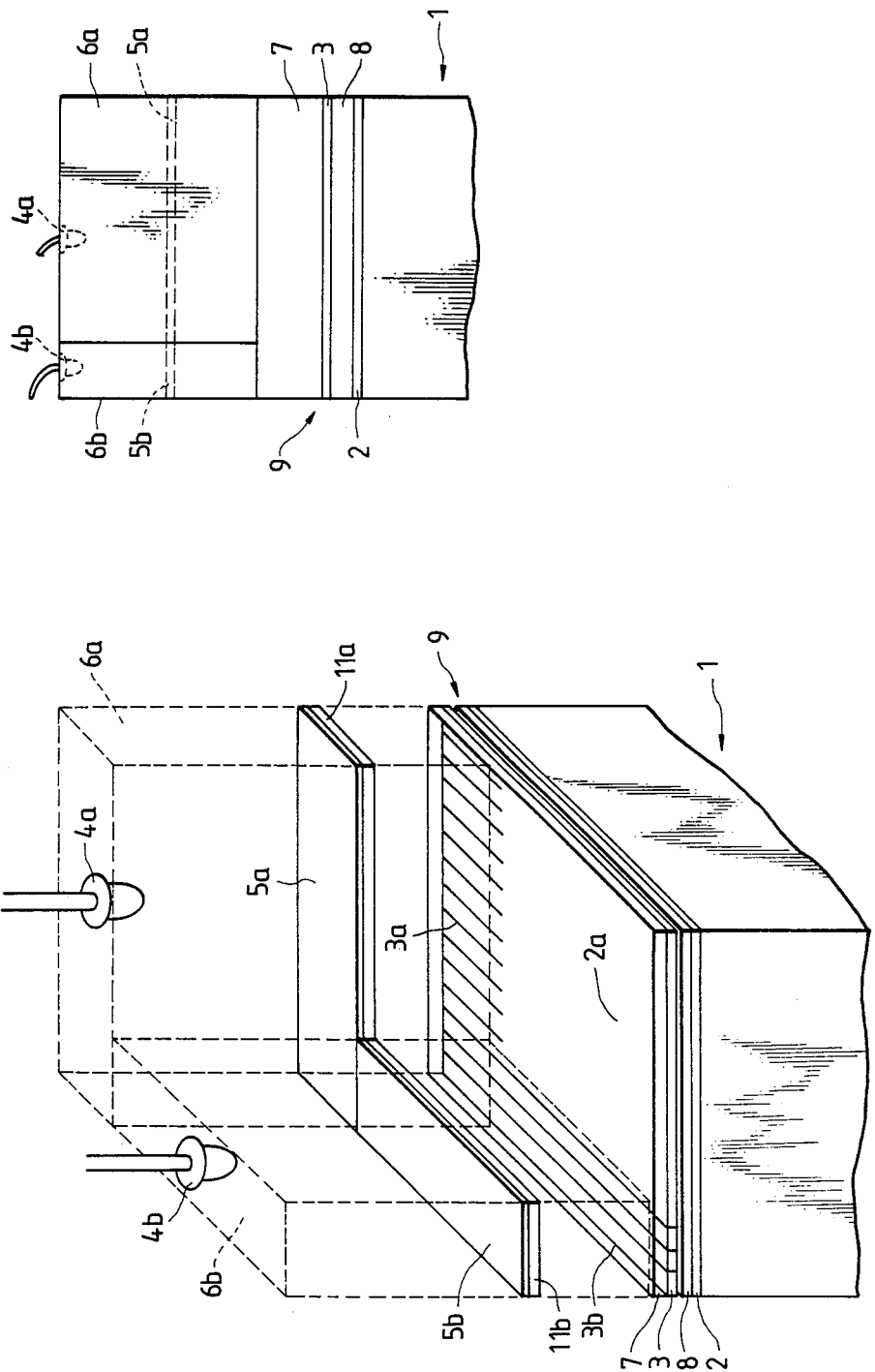

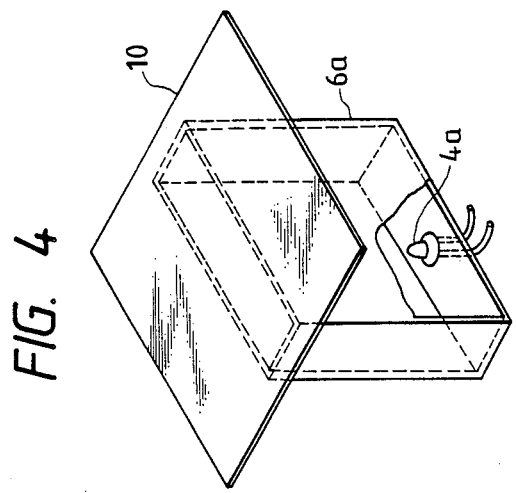
FIG. 4
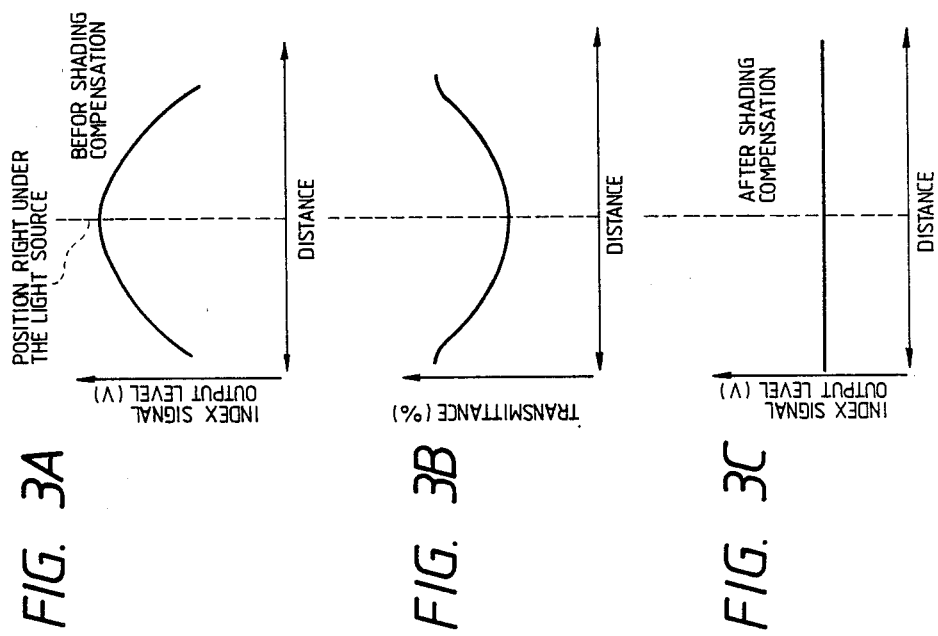
FIG. 3A
FIG. 3B
FIG. 3C

IMAGE PICKUP DEVICE WITH INDEX SIGNAL GENERATOR

BACKGROUND OF THE INVENTION

1. Field of the Invention

This invention relates to an image pickup device having an index signal generator.

2. Description of the Prior Art

Various types of image pickup devices with an index signal generator are known which produce image signal including index signals for deriving accurate synchronous signals for controlling electron beam scanning speed or spot position or for providing timing for color-multiplexed video signal demodulation. The index signal generator which is provided to an image pickup divice produces index signals. The generated index signals correspond to timing or an instantaneous position of scanning electron beam which is provided for detecting photoelectrostatic image produced from a projected optical image.

Such index generator is normally provided behind of a faceplate of an image pickup device sharing with a color stripe filter on the surface of the faceplate. The index signal generator has a stripe pattern screen, illuminating means, and light shield means. The stripe pattern screen is placed behind the faceplate. The stripe pattern covers two peripheral portions of a photosensitive layer. One peripheral portion is at the beginning of each horizontal electron beam scanning, i.e., a left end of a raster when viewed from the front thereof; the second peripheral portion, at the beginning of vertical electron beam scanning, i.e., a top end of the same raster. Additional stripe patterns may be provided as options on the other peripheral portions. The stripe pattern is arranged in such a way that electron beam scanning line perpendicularly intersects opaque bars of the stripe pattern. The stripe pattern screen is provided in the path of incident light to a photosensitive layer of the image pickup tube. A light source which illuminates the stripe pattern screen is provided so that the stripe pattern is projected to the photosensitive layer. On the other hand, an optical image is focused onto the photosensitive layer. The resulting image produces a photoelectrostatic image on the photosensitive layer. The photoelectrostatic image is detected by electron beam scanning to generate a signal of the optical image togeter with a signal of the stripe patterns which represents timing of the electron beam scanning. Thus, the resultant signal has optical image information and stripe pattern information. The stripe pattern signals are used for synchronizing the optical information signal with other signal or for scanning calibration purposes. For example, U.S. Pat. No. 4,736,243 discloses such a technique for single-tube color image pickup devices. In this color image pickup device, an optical image is focused on a photosensitive layer of a color image pickup tube through a color stripe filter having a plurality of successively arranged recurrent groups of different color stripes and converted into an electrostatic image which is scanned in rectangular raster form by an electron beam to generate a color-multiplexed video signal. First and second index stripe bars are located adjacent to edges of the rectangular raster scan area to generate first and second index signals. Prior to normal imaging, the photosensitive layer is illuminated uniformly with light of a predetermined color to generate a reference "carrier" which is stored in a field memory together with the index signals. During read mode, a carrier is generated having a component modulated in phase with the stripes of each recurrent group, and a component modulated in amplitude with the intensity of the picture elements of the image. The memory is read to generate a reference carrier as well as first and second reference index signals. These index signals are compared by comparators in frequency and phase with the corresponding index signals from the photosensitive layer and stored in sample-and-hold circuits to control the frequency and phase relationships between the modulated and reference carriers.

However, in such imaging devices with an index signal generator, there is a shading problem that a part of the projected stripe pattern onto the photosensitive layer, which part is nearest to the light source of the illuminating means is brightest and any other part becomes darker progressively as the distance from the brightest point increases. One reason is that the distance between the stripe pattern screen and the light source is relatively small so that variation of the distance is great. Another reason is as follows:

A single light source having a small light emitting spot generates sharp edge image of the stripe pattern on the photosensitive layer which generates accurate timing of the index signal. However, such a small light emitting spot naturally makes shading.

Accordingly, the level of index signal output varies in accordance with variation of brightness over a stretch of the stripe patterns. An index signal with low output level causes a low S/N ratio because an index signal processing circuit is designed to process the index signal which is expected to be its maximum level. In the above-mentioned color image pickup device, the index signal with level variation causes phase shift in color demodulation, i.e., color-demodulation error. Therefore, such index signal level variation causes unevenness of color to occur in vertical scanning direction on the resultant repoduced image.

There is also a technique where the index signal is used for controlling raster position, such as centering, in a monochrome or color image pickup device. In this device, the index signal is used for controlling start timing and speed of electron beam scanning. In such a device, the level variation of the index signal causes underscanning or oversccaning of the resultant raster.

Therefore, in the prior art image pickup device with an index signal generator, there is a drawback that the undesirably level varying index signal deteriorates the quality of a reproduced picture.

SUMMARY OF THE INVENTION

The present invention has been developed in order to remove the above-described drawbacks inherent to the conventional image pickup device with an index signal generator.

It is, therefore, an object of the present invention to provide a new and useful image pickup device with an index signal generator which is capable of suppressing the variation of output level of the index signal.

According to a feature of the present invention a shading compensation filter is provided in the path of incident light to the photosensitive layer so that light rays emitted from the illuminating means is filtered for averaging illuminance at every point of the stripe pattern, i.e., for equalizing intensity of light on the stripe pattern so that any point of the stripe pattern is uniformly lit.

In accordance with the present invention the illuminating means is provided which has a light emitting spot whose dimension in a direction perpendicular to opaque bars of the stripe pattern screen is made small for making edges of the stripe pattern image projected on the photosensitive layer sharper.

In accordance with the present invention there is provided a method of producing the shading compensation filter. The method of producing the shading compensation filter for light projection means which comprises a light shielding case holding therein illuminating means at one end thereof and a rectangular opening at other end thereof for projecting light only from said illuminating means, said method comprising steps of placing a sheet of unexposed negative film on said rectangular opening, exposing the film to said illuminating means by activating the illuminating means, developing and fixing said film. Therefore, the resultant image of the sheet of film has a transmittance distribution, i.e., transmittance pattern, which has an inverse relation with brightness distribution by a light ray from the illuminating means. The developed sheet of film placed between the illuminating means and the faceplate equalizes illuminance distribution on the stripe patten screen to serve as a shading compensation filter.

In accordance with the present invention there is provided an image pickup device with index signal generator, comprising: an image pickup tube; and index signal generating means having; illuminating means for illuminating a peripheral portion of a photosensitive layer of said image pickup tube; and light shield means for preventing said peripheral portion from being illuminated by light coming from other than said illuminating means; and a screen having a stripe pattern covering said peripheral portion, provided at a predetermined place between said illuminating means and said peripheral portion, said stripe pattern having opaque bars spaced at a predetermined interval and so arranged that horizontal electron beam scanning line of said image pickup tube perpendicularly intersects said opaque bars, the improvement comprises: a filter means provided at a predetermined place between said illuminating means and said peripheral portion, having transmittance pattern which equalizes illuminance variation on said stripe pattern caused by said illuminating means so that illuminance at any point of said stripe pattern becomes uniform.

BRIEF DESCRIPTION OF THE DRAWINGS

The object and features of the present invention will become more readily apparent from the following detailed description of the preferred embodiments taken in conjunction with the accompanying drawings in which:

FIG. 1 is a fragmentary perspective view of the image pickup device with index signal generator according to an embodiment of the present invention;

FIG. 2 is a fragmentary front elevational view of the image pickup device of FIG. 1;

FIGS. 3A, 3B and 3C show index signal output curves for describing compensation filter operation;

FIG. 4 is an illustration of the process for making a compensation filter; and

The same or corresponding elements and parts are designated at like reference numerals throughout the drawings.

DETAILED DESCRIPTION OF THE INVENTION

Figure 5:
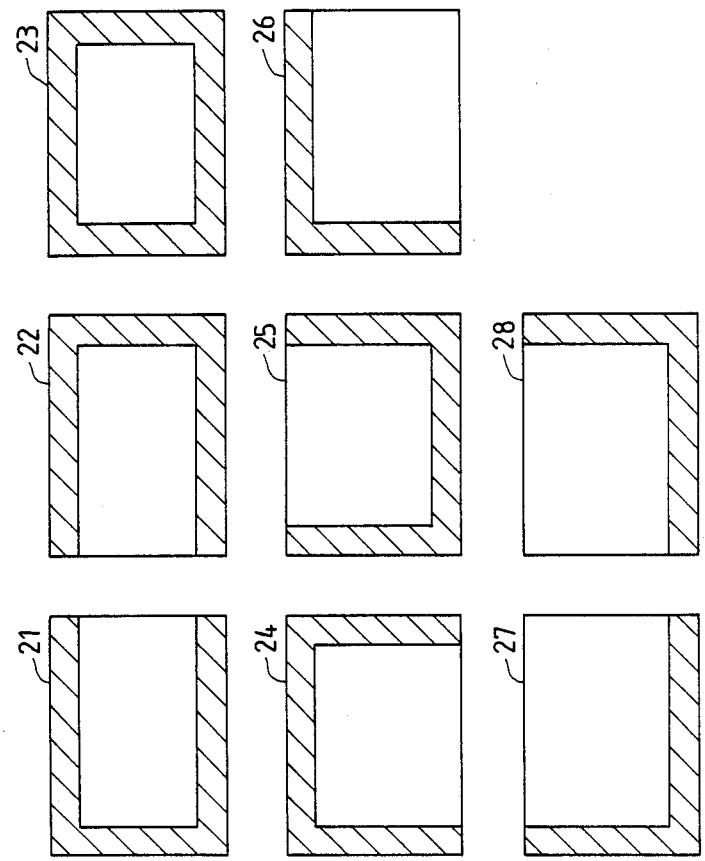
FIG. 5 is a schematic illustration of arrangements of stripe pattern.

Referring now to FIG. 1, a schematic diagram of an embodiment of the present invention is shown by way of a perspective view. A glass tube (envelope) for the pickup tube 1 is not shown in the figure except a faceplate 7.

The image pickup device with index signal generator of FIG. 1 comprises an image pickup tube 1 having a front part 9 which receives incident light. The front part 9 comprises the faceplate 7, a stripe pattern screen 3 deposited thereon at the rear side thereof, an overcoat glass 8 covering the stripe pattern screen 3, a photosensitive layer 2 provided farther on the overcoat glass 8. The overcoat glass 8 and faceplate 7 are bonded each other with the stripe pattern screen 3 being sandwiched therebetween. The stripe pattern screen 3 has index signal generation portions 3a, and 3b. The peripheral portions 3a, 3b locate at the beginning of vertical and horizontal electron beam scanning of the image pickup tube 1. A pattern of the stripe pattern screen 3 is formed in such a way that opaque bars thereof perpendicularly intersects horizontal electron beam scanning lines and are spaced at a predetermined interval. Light shield boxes 6a, 6b are placed over the peripheral portions 3a, 3b respectively. The light shield boxes 6a, 6b respectively hold light emitting diodes 4a, 4b, as illuminating means, which are respectively exposed to the inside of the light shield boxes 6a, 6b. The light emitting diodes 4a, 4b are located behind a picture taking lens system (not shown), and are opposing the stripe pattern screen 3. The light shield boxes 6a, 6b also hold shading compensation filters 5a, 5b respectively in the light path from the light emitting diodes 4a, 4b to the faceplate 7 with retainers 11a, 11b. However, the shading compensation filters 5a, 5b can also be located on the faceplate 7, by being interposed between the light shield boxes 6a, 6b and the faceplate 7.

The light shield boxes 6a, 6b are made of an opaque material to prevent that light ray from the light emitting diodes 4a, 4b hits an image formation portion 2a of the photosensitive layer 2 and an ambient light hits the index signal generation portions 3a, 3b. The light emitting diode 4a illuminates index signal generation portion 3a; light emitting diode 4b, index signal generation portion 3b.

As shown in FIG. 2, faceplate 7, stripe pattern screen 3, overcoat glass 8, and photosensitive layer 2 are formed with intimately contacting. The stripe pattern screen 3 and the photosensitive layer 2 are spaced by the thickness of overcoat glass 8. For the reason, a light source of an oversize light emitting spot if used, would produce a blurr image of the stripe pattern on the photosensitive layer 2, which would cause the generated index signals having inaccurate timing. The inaccurate timing invites the aforementioned drawback due to color-demodulation error. Accordingly, the light sources 4a, 4b of illuminating means should have a small profile of the light emitting spot in the direction of horizontal electron beam scanning. In this embodiment of the present invention, the light emitting diodes 4a, 4b meet this requirement, which are considered to be a point light source in this regard.

In addition, since the light emitting diodes 4a, 4b occupy small spaces, they can be housed in the light shield box 6a, 6b which are arranged between unshown picture taking lens system and faceplate 7. In this embodiment of the present invention, an image pickup tube of ⅔-inch is used. The distance from light source 4a, 4b to the shading compensation filter 5a, 5b is 6 mm; the distance from the light source 4a, 4b to the faceplate 7, 8 mm. Therefore, the light shield box with the light source 4a, 4b, and shading compensation filter 5a, 5b are able to be housed in the space between the unshown picture taking lens system and the faceplate 7 because the distance from the unshown picture taking lens system and the faceplate 7 is 10 mm. In the above-mentioned single-tube color image pickup device of color-multiplexed signal demodulation system, a color stripe filter (not shown) is formed on the same surface of the faceplate 7 on which the stripe pattern screen 3 is deposited. The color stripe filter occupies an area other than the index signal generating portions 3a, 3b do. The color stripe filter has a plurality of successively arranged recurrent groups of different color stripes.

Hereinbelow, will be described the shading compensation filter 5a, 5b, referring to FIGS. 3A, 3B, and 3C. However, as the shading compensation filters 5a and 5b have the same function between them, only the shading compensation filter 5a will be described.

Since the light source 4a serves substantialy as a point light source, the point at the stripe pattern screen right under the light source is brightest. Brightness at any other point progressively decreases with increase of distance from the brightest point. This fact causes shading of the stripe pattern image projected by the light source 4a onto photosensitive layer 2. Thus, a level of the index signal derived from such a shaded image varies, as shown in FIG. 3A. The brightest point will generate the maximum output level of the index signal. Output level of the index signal at any other point decreases with increase of distance from the brightest point. The variation of the index signal output level corresponds to that of brightness measured along the index signal generation portion 3a.

In this embodiment of the present invention, the above-mentioned variation of index signal output is compensated with the shading compensation filter 5a which has a transmittance pattern having an inverse relationship with the above-mentioned variation of brightness on the index signal generation portion 3a, as shown in FIG. 3B. The shading compensation filter 5a is provided at a predetermined place between the light source 4a and the faceplate 7. In this embodiment, the shading compensation filter 5a is located with the distance of 2 mm above the faceplate 7. The shading compensation filter 5a equalizes the variation of brightness by the light source 4a on the stripe pattern screen 3 to even. Thus, shading on the stripe pattern screen 3 is compensated for so that the output level of the index signal is made constant as shown in FIG. 3 C.

Therefore, the above-mentioned the single-tube color image pickup device having an index generator with the output level of index signal equalized, removes aforementioned color demodulation error which occurs as unevenness of color in the vertical direction of electron beam scanning.

In the above-mentioned image pickup device with an index signal generator used in the aforementioned raster position controlled sytem, equalizing the output of the index signal makes the timing derived from the index signal accurate so that the problem of underscanning or overscanning of the electron beam is eliminated.

In addition, because output level of the index signal is substantialy constant, the index signal processing circuit which receives the index signal and gives timing to other circuitry can be made simple.

In the above-described embodiment, index signal generators are provided at the peripheral portions at the beginning of vertical electron beam scanning and at the peripheral portion at the beginning of horizontal electron beam scanning. However, the stripe pattern may be arranged in various forms, i.e., stripe pattern arrangements 21, 22, 23, 24, 25, 26, 27, 28, as shown FIG. 5. The index signal generators may be also provided in accordance with such stripe pattern arrangement of FIG. 5.

In FIG. 5, the outer recutanglars indicate electron beam scanning areas; the hatched areas, the stripe pattern areas. The horizontal direction of the drawing indicates horizontal scanning of electron beam; vertical direction of the drawing, vertical electron beam scanning.

Hereinbelow will described the method of making the shading compensation filters 5a, 5b. However, as shading compensation filters 5a, 5b are made in the same way, only the method of making compensation filter 5a will be described referring to FIG. 4.

A sheet of negative film 10 (unexposed) is placed to the opening of the light shield box 6a before being assembled to the image pickup device 1, and is exposed to light ray from the light source 4a, then the exposed film is developed and fixed by chemical process. The entire process may be carried out in a darkroom. The developed image has transmittance distribution of FIG. 3B, i.e., transmittance pattern. The sheet of film is cut to the size and then fixed to the light shield box 6a with the retainer 11a. In turn, the light shield box 6a with the processed film fixed is assembled to the image pickup device so as to oppose the index signal generation portion 3a across the faceplate 7.

By using this procedure, if desired, the shading compensation filter 5a or 5b can be customerized or made to each of the individual light source 4a or 4b, or to each of the light shield box 6a or 6b, or to each of the image pickup tube 1 in mass production of the image pickup device. The light shield box 6a, 6b may be assembled to the image pickup device with the openings thereof in contact with the faceplate 7. However, in this embodiment the shading filter 5a is located midway of the light path for the convenience of holding the same.

The light source 4a is a light emitting diode whose peak of intensity of emitting light in wave length is 660 nm. However, any light emitting diode is applicable which has a wave length and intensity of emitting light enough to match the sensitivity range of the image pickup tube 1. The sheet of negative film is exposed in the condition that peak brightness thereon is approximately 0.5 mcd and the exposing period of time is approximately 1 msec. The light emitting diodes 4a, 4b have a lens thereon. However, light emitting diodes without lens can be usable. The sheet of negative film is of monochrome, pancrhomatic, continuous tone type which has sensitivity of ASA 100. Technically, the shading compensation filters 5a, 5b if desired, can be formed directly on the faceplate 7 by photochemical process.

Further, the entire process of producing the shading compensation filters 5a and 5b may be carried out in a dark room without detaching the light shield boxes 6a and 6b from the image pickup device, if a small enough space is provided between a set of the boxes 6a and 6b and the faceplate 7 to interpose an unexposed negative film 10 which is a type of film requiring only dry processes for fixing image.

The assembled light shield box 6a with shading filter 5a which is made by the above-mentioned method is improved in variation of index signal output level. For example, some samples which have the above-mentioned structure but having no the shading compensation filters 5a, 5b have the ratio of the index signal output level of minimum to maximum is 50 to 100. However, the ratio of the samples with the shading filter 5a is improved to 90 to 100. Therefore, the shading problem is substantially eliminated.

The above-described embodiment is just an example of the present invention, and therefore, it will be apparent for those skilled in the art that many modifications and variations may be made without departing from the scope of the present invention.

What is claimed is:

1. An image pickup device having an image pickup tube; and index signal generating means having; illuminating means for illuminating a peripheral portion of a photosensitive layer of said image pickup tube; and light shield means for preventing said peripheral portion from being illuminated by light coming from other than said illuminating means; and a screen having a stripe pattern covering said peripheral portion, provided at a predetermined place between said illuminating means and said peripheral portion, said stripe pattern having opaque bars spaced at a predetermined interval and so arranged that horizontal electron beam scanning line of said image pickup tube perpendicularly intersects said opaque bars, the improvement comprises:

a filter means provided at a predetermined place between said illuminating means and said peripheral portion, having transmittance pattern which equalizes illuminance variation on said stripe pattern caused by said illuminating means so that illuminance at any point of said stripe pattern becomes uniform.

2. An image pickup device as claimed in claim 1, wherein said transmittance pattern is formed in such a way that the transmittance at any point over said filter has a inverse relationship with the illuminanace variation on said stripe pattern caused by said illuminating means when said filter means is not provided.

3. An image pickup device as claimed in claim 1, wherein said light shield means is a box which has an opening for projecting light from said illuminating means to said stripe pattern when said box is assembled to the image pickup tube.

* * * * *

UNITED STATES PATENT AND TRADEMARK OFFICE
CERTIFICATE OF CORRECTION

PATENT NO. : 4,897,730

DATED : January 30, 1990

INVENTOR(S) : Makoto IWAHARA et al.

It is certified that error appears in the above-identified patent and that said Letters Patent is hereby corrected as shown below:

On the title page, item [75] should be:

Makoto Iwahara
    Hiroshi Ichimura

Signed and Sealed this

Ninth Day of April, 1991

Attest:

HARRY F. MANBECK, JR.

Attesting Officer      Commissioner of Patents and Trademarks

UNITED STATES PATENT AND TRADEMARK OFFICE
CERTIFICATE OF CORRECTION

PATENT NO. : 4,897,730

DATED : January 30, 1990

INVENTOR(S) : Makoto IWAHARA et al

It is certified that error appears in the above-identified patent and that said Letters Patent is hereby corrected as shown below:

On the title page, item [75] should be:

Makoto Iwahara, Yokohama; Itsuo Takanashi, Kamakura;
Shintaro Nakagaki, Fujisawa; Hiroshi Ichimura;
Ichiro Negishi, both of Yokohama; Masaru Osada, Yokosuka;
Wataru Katase, Yokohama, all of Japan This certificate supersedes Certificate of Correction issued April 9, 1991.

Signed and Sealed this

Thirtieth Day of July, 1991

*Attest:*

HARRY F. MANBECK, JR.

*Attesting Officer*  *Commissioner of Patents and Trademarks*